July 15, 1958

C. A. KIEFFABER 2,843,062

BREAD MOLDING MACHINE

Filed Sept. 13, 1954

INVENTOR.
CLARENCE A. KIEFFABER
BY
Alfred R. Fuchs
ATTORNEY

July 15, 1958

C. A. KIEFFABER 2,843,062

BREAD MOLDING MACHINE

Filed Sept. 13, 1954

INVENTOR.
CLARENCE A. KIEFFABER
BY
*Alfred R. Fuchs*
ATTORNEY

July 15, 1958

C. A. KIEFFABER 2,843,062

BREAD MOLDING MACHINE

Filed Sept. 13, 1954

INVENTOR.
CLARENCE A. KIEFFABER
BY
Alfred R. Fuchs
ATTORNEY

July 15, 1958 C. A. KIEFFABER 2,843,062
BREAD MOLDING MACHINE
Filed Sept. 13, 1954 8 Sheets-Sheet 6

INVENTOR.
CLARENCE A. KIEFFABER
BY
Alfred R. Fuchs
ATTORNEY

July 15, 1958 C. A. KIEFFABER 2,843,062
BREAD MOLDING MACHINE
Filed Sept. 13, 1954 8 Sheets-Sheet 8

INVENTOR.
CLARENCE A. KIEFFABER
BY Alfred R. Fuchs
ATTORNEY

2,843,062

BREAD MOLDING MACHINE

Clarence A. Kieffaber, Overland Park, Kans., assignor to Stickelber & Sons, Inc., a corporation of Missouri Application September 13, 1954, Serial No. 455,672

25 Claims. (Cl. 107—8)

My invention relates to bread molding machines, and more particularly to a bread molding machine that embodies twisting mechanism.

It is a purpose of my invention to provide a bread molding machine with means for forming a loaf by twisting together a plurality of loaf portions of equal size and the same shape to form the loaf. Preferably my machine is constructed and arranged to twist together a pair of such loaf portions to form the loaf.

The loaf portions from which the loaf is formed in my machine are made in the usual manner by sheeting pieces of dough and coiling these up on themselves to form a substantially cylindrical loaf portion, said loaf portions being all of substantially uniform size and proportions. The particular manner in which these loaf portions are molded may be varied in accordance with the practices now known in the art, but instead of making a coiled dough piece of full size, the dough is divided so as to produce coiled loaf portions of half the size of the completed loaf after the twisting operation has taken place. The purpose of twisting the loaf portions about each other is to produce a better, more uniform texture to the finished loaf and avoid thereby the formation of any large holes or hard cores in the finished loaf.

While twisting of two or more duplicate loaf portions has been previously practiced by hand and has been attempted by machine, the hand operation is slow and requires several men to do the twisting to keep up with the formation of the loaf portions by the modern molding machine. Attempts to twist the loaf portions by machine have encountered difficulties because of the tendency of the twisted loaf portions forming the loaf to partially untwist, and because of the complexity of the mechanism that had been used in attempts to carry out machine twisting or because of the slowness of the machines as compared with the molding machines used in modern bakery practice.

It is the principal purpose of my invention to provide a bread molding machine that embodies twisting mechanism that is of such a character that it is capable of twisting the loaf portions into twisted loaves as rapidly as the loaf portions are formed by the molding machines used in present day bakery practice and which will produce a twisted loaf that will not untwist after the loaf portions have been twisted together and which is relatively simple in construction and operation.

It is an important purpose of my invention to provide a machine of the above mentioned character that is reliable in operation and in which the operation of the machine is controlled by the delivery of the molded loaf portions to a hopper in position to be supplied to the twisting mechanism simultaneously and by a succeeding loaf portion reaching a point in its approach to said hopper such that the desired number of loaf portions in the hopper in proper postion to be fed to the twisting mechanism is assured before a sequence of operations, to be referred to below, is initiated. It is, of course, to be understood that in bread molding machines such as are well known in the art, the coiled up pieces of dough that have been formed into loaf portions are produced at regular intervals so that these will approach the twisting mechanism in substantially regular order and that by providing controlling means actuated by said loaf portions associated with conveying means that feed said loaf portions to the hopper, the successive operation of all of the various mechanisms involved in the twisting of the loaf portions to form the loaf are always begun with a loaf portion at a predetermined point from the hopper and approaching the same at the rate of travel of the conveying means that feeds said loaf portion to the hopper.

More specifically my invention comprises a twisting mechanism, which is set in operation to perform a twisting operation by controlling means actuated by an electrical controlling circuit that has a pair of switches in series therein so that both have to be closed to close said circuit, said switches being operated by the last of a plurality of loaf portions that are to be twisted together to form the loaf after it has reached its position in the hopper and a succeeding loaf portion that has reached a predetermined control point on the conveying means feeding the loaf portions to the hopper.

It is a particular purpose of my invention to provide twisting mechanism the operation of which is controlled in the above referred to manner, in which said controlling circuit controls the operation of means for permitting the rotation of a cam shaft through one turn, which cam shaft is provided with cams that successively actuate controlling devices that successively operate the various mechanisms that carry out the twisting operation and deliver the twisted loaf in twisted condition to a panning conveyor belt for deposit in a pan.

My invention includes a twisting mechanism comprising a pair of twisting members and means for rotating the same in opposite directions, said twisting members being provided with a pair of trough-like or cup-like receptacles for the ends of the elongated loaf portions and a support, preferably, in the form of a conveyor belt for the mid-portion of the loaf portions, said twisting members being located above said support so that upon withdrawal of the same from a position in which the same support the ends of the loaf portions the loaf formed from the loaf portions will be supported entirely on the conveyor belt or similar supporting member.

More specifically my improved twisting mechanism comprises rotatable twisting members that are axially spaced in position above a conveyor belt and are movable between two positions crosswise of the conveyor belt, in one of which they are in position to receive the ends of the loaf portions and in the other position of which they are so located that the loaf portions have been completely withdrawn therefrom, and to provide means for rotating said twisting members simultaneously in opposite directions, and further to provide in conjunction with such twisting members means for holding the loaf portions in engagement with the twisting members comprising holding flaps mounted on the twisting members that are adapted to be moved into and out of holding position in such a manner that the same are holding the loaf portions before rotation of the twisting members begins and are moved out of holding engagement as soon as the rotation of the twisting members to form the twisted loaf has been completed.

My invention further includes new and improved means for cooperating with twisting members of the above mentioned character and particularly with the supporting means in the form of a conveyor belt serving to prevent untwisting of the twisted together loaf portions after the twisting operation has been completed, said means comprising a holding flap cooperating with said conveyor belt and a rotatable member for exerting a force on the twisted together loaf portions at one end thereof at which there is a tendency for the same to become untwisted, while traveling along with the conveyor belt which serves as means to carry the twisted loaves to pans the feeding of which is controlled so that a twisted loaf is deposited in each pan provided therefor.

My invention further comprises in cooperation with said twisting means and means for holding the twisted loaf from untwisting, a pressure roller which acts on the twisted loaf to cause firm adherence of the twisted loaf portions to each other so that no further likelihood of untwisting after engagement with said pressure roller will occur.

Other objects and advantages of my invention will appear as the description of the drawings proceeds. I desire to have it understood, however, that I do not intend to limit myself to the particular details shown or described, except as defined in the claims.

Referring in detail to the drawings, my improved twisting mechanism is shown as being applied to a bread molding machine that has an upper frame portion 20, a vertically extending frame portion 21, a pair of side plates 22 secured to said frame, upper horizontally extending frame members 23 having upstanding frame members 24 thereon and lower horizontally extending frame members 25.

The conveyor belt 26 operates in the direction of the arrow in Figs. 1, 2, 3, 4 and 6 and is mounted in a well known mannner on the frame portion 20. Said conveyor is driven in a well known manner by a driven roller and operates over the roller 27 at the end thereof that is shown in the drawings. Said conveyor belt 26 is a delivery means for loaf portions, indicated diagrammatically at 28 in Fig. 2, which have been molded in the usual manner by sheeting lumps or rounded pieces of dough and coiling or curling these up on themselves and compacting the coiled up sheeted dough piece to form a molded loaf portion, which is substantially cylindrical in character, the various loaf portions 28 being of substantially uniform length and diameter. A pair of standards 29 is provided on the frame 20, in which a shaft 30 is pivotally mounted, which carries a gate 31, and it will be obvious that as a loaf portion 28 passes into engagement with the gate 31 by movement of the conveyor in the direction indicated, such as from right to left in Fig. 2, the gate 31 will be raised or will be swung around on its pivotal axis in a clockwise direction, as viewed in Figs. 2 and 11.

Figure 4:
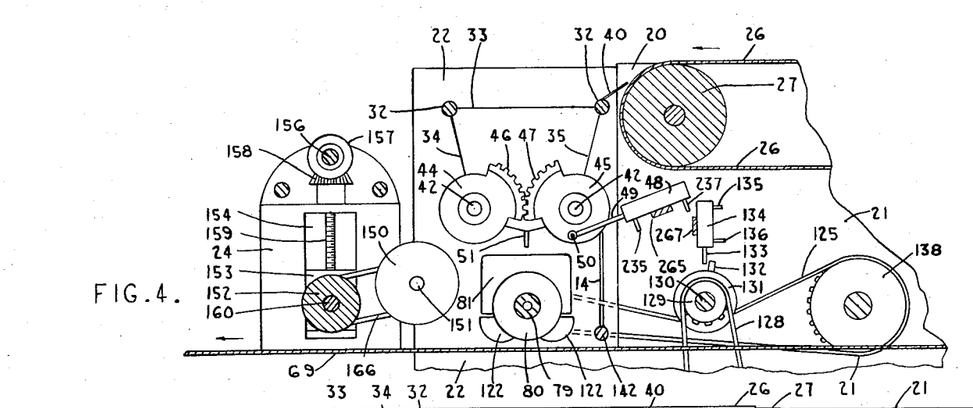
Fig. 4 is a section on an enlarged scale, partly broken away, taken on the line 4—4 of Fig. 1.

Extending between the plates 22 is a pair of rods 32 on which the hopper 33 is mounted. Said hopper has a pair of vertical side walls and the inclined end walls 34 and 35. Mounted to swing about suitable pivots 36 mounted in the side walls of the hopper is a plate 37, which serves as deflecting and partitioning means for the hopper to divide said hopper into a pair of compartments 38 and 39 when said member 37 is in the dotted line position shown in Fig. 6. It will be noted that the plate 37 is overbalanced so as to tends to assume the full line position shown in Fig. 6 when free to move to a position determined by its own weight. A guide plate 40 is also preferably provided extending from the discharge end of the conveyor belt 26 to the edge of the hopper and thus closely adjacent the upper end edge of the plate 37. The bottom of the hopper is formed by means of a pair of swingingly mounted bottom closure members or doors 41, which are mounted on shafts 42 that are pivotally mounted in suitable bearings 43 provided on the hopper. The hopper doors or closure members 41 are controlled in their position by means of a pair of disk-like members 44 and 45 that are provided on the one end of the shafts 42, said disk-like members 44 and 45 having segmental gears 46 and 47 provided thereon that mesh as shown in Fig. 4. The position of the members 44 and 45 is determined by means of a piston in a compressed air cylinder 48 mounted on the bracket 265 on the vertical frame portion 21, said piston being connected by means of a piston rod 49, pivoted at 50, with the one disk-like member 45. The position of the piston in the cylinder 48 is determined in a manner to be described below.

Figure 6:
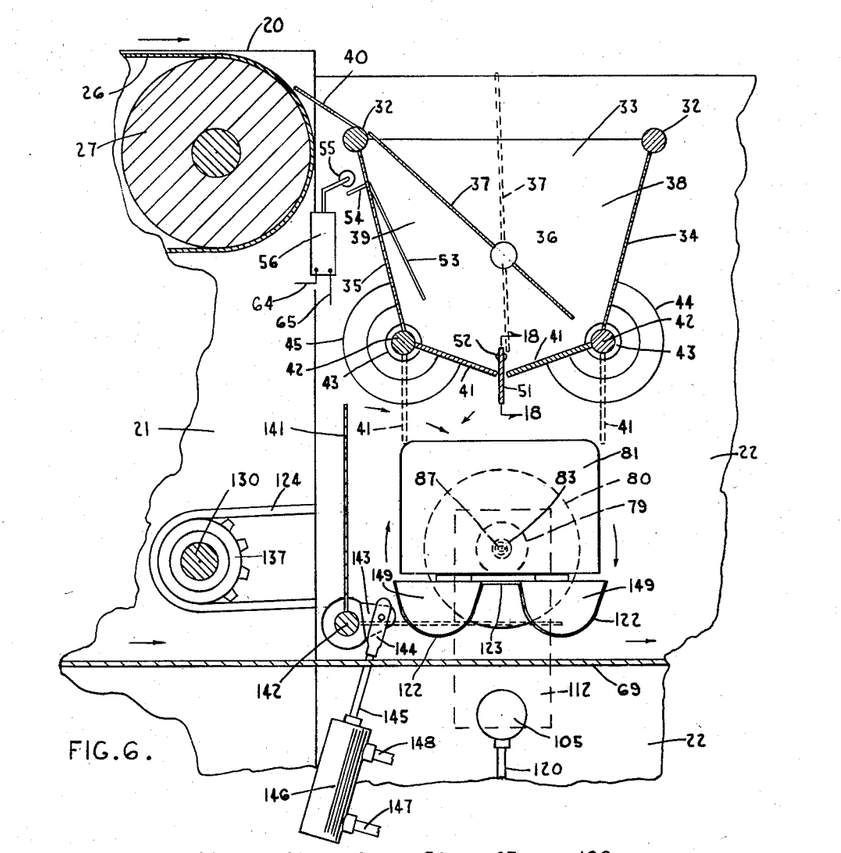
Fig. 6 is a fragmentary vertical sectional view on a still larger scale through the center of the hopper and showing one of the twisting members and the twisting conveyor belt, as well as the conveyor belt of the molding machine.

The lower end of the partition 37 engages a vertical wall 51, said member 37 forming a vertical partition in the lower portion of the hopper 33 when in its dotted position. Said wall 51 divides the hopper into two pockets at the lower portion thereof above each of the bottom closures 41, the contents of the compartment 38 and of the compartment 39 thus being kept separate by means of the partition 51. Said partition 51 is held normally in fixed position, but a pair of set screws 52 is provided whereby said partition may be detached from the side walls of the hopper 33, if this is found to be desirable for a purpose to be described below. It will be noted that the partition 51 extends both above and below the doors or closure members 41 when these are in closed position, as shown in Fig. 6 in full lines. Said doors are shown in an open position in dotted lines in Fig. 6. Mounted in the compartment 39 adjacent the wall 35 and extending through a slot therein is a switch operating member which has a long arm 53 within the hopper and a short arm 54 extending out through the hopper wall 35 so as to project therefrom as shown in Fig. 6.

When a loaf portion 28 is discharged from the conveyor belt 26 it will travel down the guide plate 40 onto the plate 37 and roll or slide down the same until it is below the pivotal axis thereof, whereupon it will swing the plate 37 to the dotted line position and said loaf portion will assume a position on the door 41 at the bottom of the compartment 38, the doors being at this time in a closed position. The next succeeding loaf portion 28, which will eventually be twisted with the loaf portion 28 that has passed into the compartment 38, will be deposited into the compartment 39 due to the cooperative action of the inclined plate 40 and the vertically positioned plate 37 and will be deposited on top of the door 41 at the bottom of said compartment 39. However, said second loaf portion will engage the portion 53 of the switch operating member mounted in said compartment 39 and will move it and hold it in a position adjacent the wall 35. This will cause the portion 54 of said switch operating member to move upwardly engaging the switch operating member 55 of a switch 56 to move it to a closing position, said switch being normally in an open position when the switch operating member 55 is in the position shown in Fig. 6. The switch 56 is located in a circuit which is shown diagrammatically in Fig. 14. Said switch 56 will remain in its closed position as long as the loaf portion that has been deposited in the compartment 39 remains therein.

Figures 1, 11:
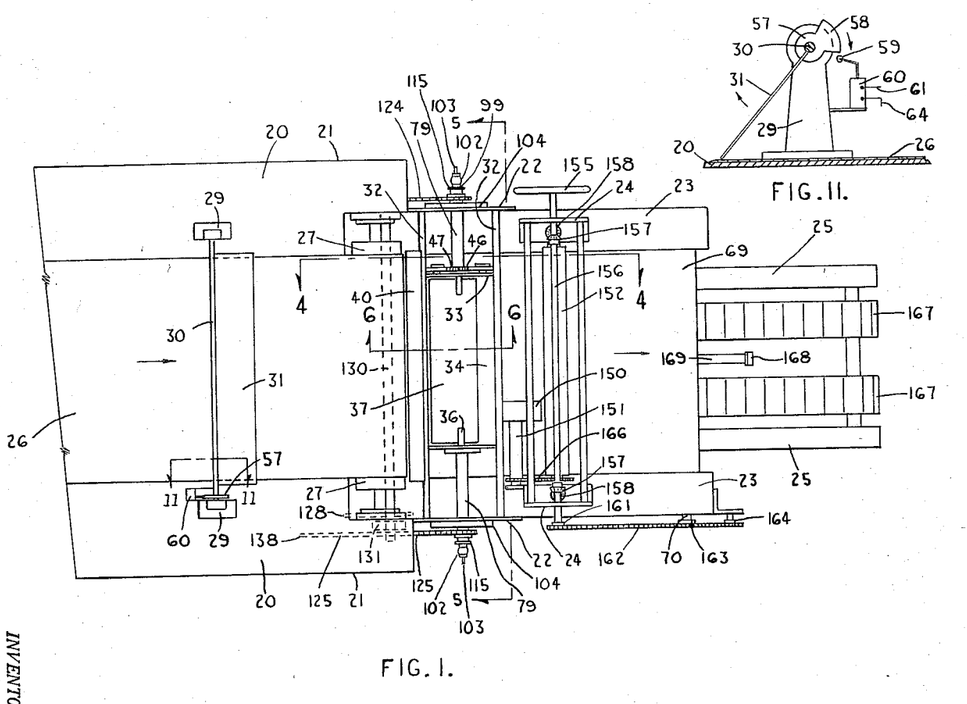
Fig. 1 is a plan view of a fragmentary portion of a bread molding machine showing my improved twisting apparatus applied thereto.
Fig. 11 is a fragmentary detail view partly in section and partly in elevation, showing the switch operating means associated with the molding machine conveyor belt.
Figure 2:
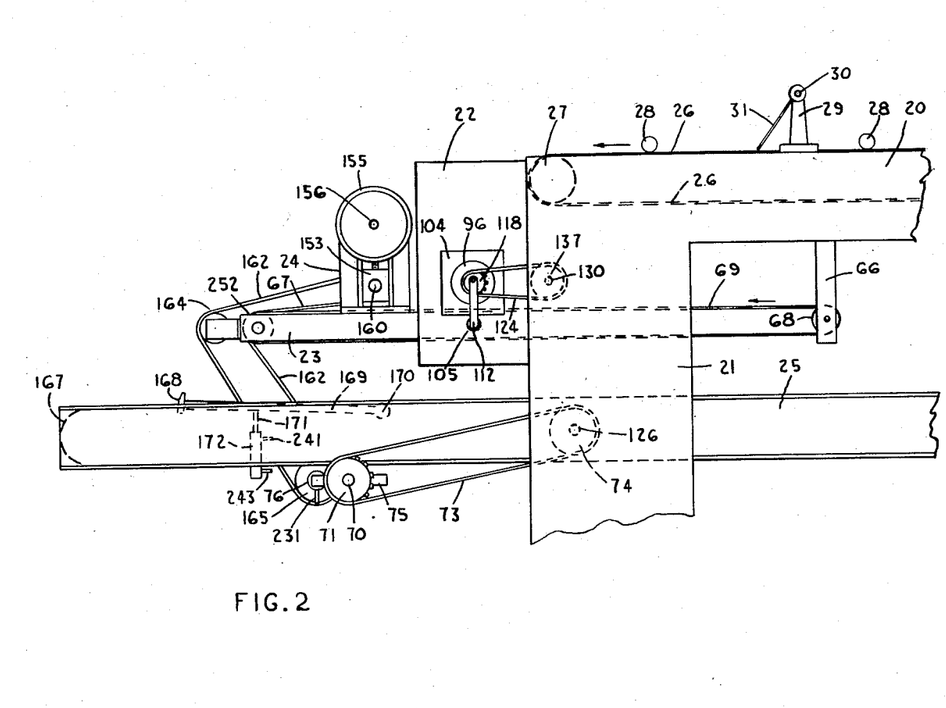
Fig. 2 is a fragmentary side elevational view of said molding machine and my improved twisting mechanism.

The shaft 30 has a cam 57 provided thereon which has a high portion 58, and it will be obvious that upon clockwise movement of the gate 31 the cam 57 will also be moved in a clockwise direction as viewed in Figs. 2 and 11, as it is fixed on the shaft 30, and the high portion 58 of the cam will engage a switch operating member 59 of a switch 60 moving said switch 60 to circuit closing position, the switch 60 being normally held in open circuit condition when the switch operating member 39 is in the position shown in Fig. 11. Thus the switch 60 will be closed each time that a loaf portion passes into engagement with the gate 31, but it will be noted upon reference to Fig. 14 that the line conductors 61 and 62, which lead to the winding 63, which is a solenoid that serves to operate certain controlling mechanism to be described below, do not provide a closed circuit for energizing the solenoid 63 unless both the switches 60 and 56 are in circuit closing position due to the fact that these are connected in series, a conductor 64 being provided leading from one terminal of the switch 60 to a terminal of the switch 56 and a conductor 65 leading from the other terminal of the switch 56 to one end of the winding 63, the line conductor 61 being connected with the other terminal of the switch 60, as will be obvious from Figs. 6, 11 and 14. Thus it is necessary for two loaf portions that are to be twisted together to be located in the hopper and another loaf portion to have reached a point spaced from the hopper at which the gate 31 is located in order for the means actuated by the solenoid 63 to be put in operation.

Figure 5:
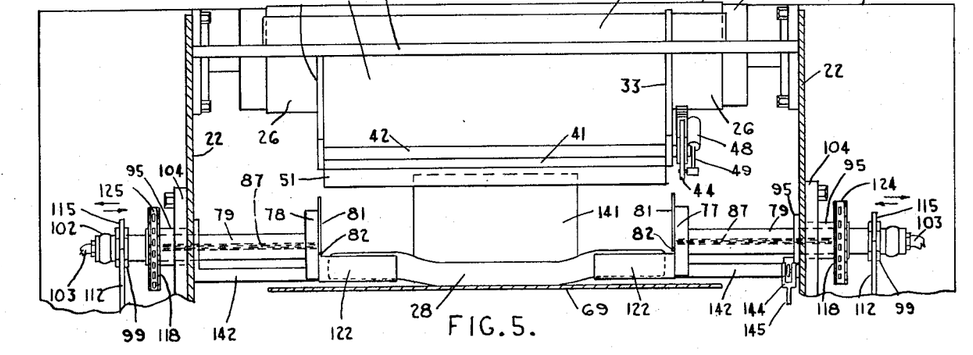
Fig. 5 is a similar section taken on the line 5—5 of Fig. 1, showing the loaf portions in position on the twisting mechanism prior to being twisted into a loaf.

Mounted on the frame members 23 and on brackets 66 depending from the frame portion 20 are the rollers 67 and 68 over which the conveyor belt 69 operates, said conveyor belt traveling in the direction indicated by the arrows in Figs. 1, 2, 4 and 6. A shaft 70 has a sprocket 71 thereon for driving said shaft through a clutch. The sprocket 71 is free to rotate on shaft 70 except when a clutch between said shaft 70 and sprocket 71 is engaged. A chain 73 passes over the sprocket 71 and over a sprocket 74, which is part of the driving means for the pan conveyor to be described below and which rotates continuously. Thus the shaft 70 rotates intermittently, the rotation thereof being dependent upon the position of said clutch. The position of the clutch is determined by a clutch operating member 75 the position of which is controlled by a piston in a compressed air cylinder 76 and the position of the piston in said cylinder 76 is determined by suitable operating means under the control of the controlling circuit including the solenoid 63, said controlling means operating to disengage the clutch so that the shaft 70 is stationary when a pair of loaf portions 28 is discharged from the hopper 33 in a manner to be described below. The shaft 70 has a gear 72 thereon rotating therewith and meshing with a gear 250 on the shaft 251 having the sprocket 165 mounted thereon to rotate therewith over which a sprocket chain 162 operates, which also operates over the sprocket 163 fixed on the shaft 252 of driven roller 67. Accordingly the conveyor belt 69 is stationary at the time of discharge of said loaf portions from the hopper 33 onto the belt 69 and comprises a stationary supporting member for said loaf portions, the loaf portion being in the position shown in Fig. 5 when the deposit thereof on the belt 69 occurs.

Cooperating with the belt 69 in stationary condition to twist the loaf portions 28 about each other into a twisted loaf is a pair of twisting members 77 and 78. Said twisting members are the same in detail construction, but rotate in opposite directions in the operation of the machine, and in order to distinguish between the same have been referred to by two different reference numerals. Each of said twisting members has a tubular shank portion 79 and an upstanding circular wall 80 forming a flange at one end thereof. A flap 81 is secured to each of the flanges 80 below the tubular member 79 by means of a hinge 82, said flap being made of sheet material and, preferably, of a synthetic resin material, such as polytetrafluoroethylene. The tubular member 79 has a passage 83 therein of relatively small diameter and said passage 83 has an enlargement 84 in the end thereof adjacent the flange 80 to accommodate a pair of links 85 and 86, which are connected pivotally, respectively, with a rod 87 and a bracket 88 provided on the flap 81. The rod 87 is longitudinally slidably mounted in the passage 83 and has a head 89 thereon mounted in an enlargement 90 of said passage at the opposite end thereof from the flange 80, between which and a shoulder 91 is mounted a compression coil spring 92, which tends to hold the flaps 81 in the raised position shown in Fig. 5, the flap 81 being shown in an intermediate position in Fig. 15.

Figures 15, 16:
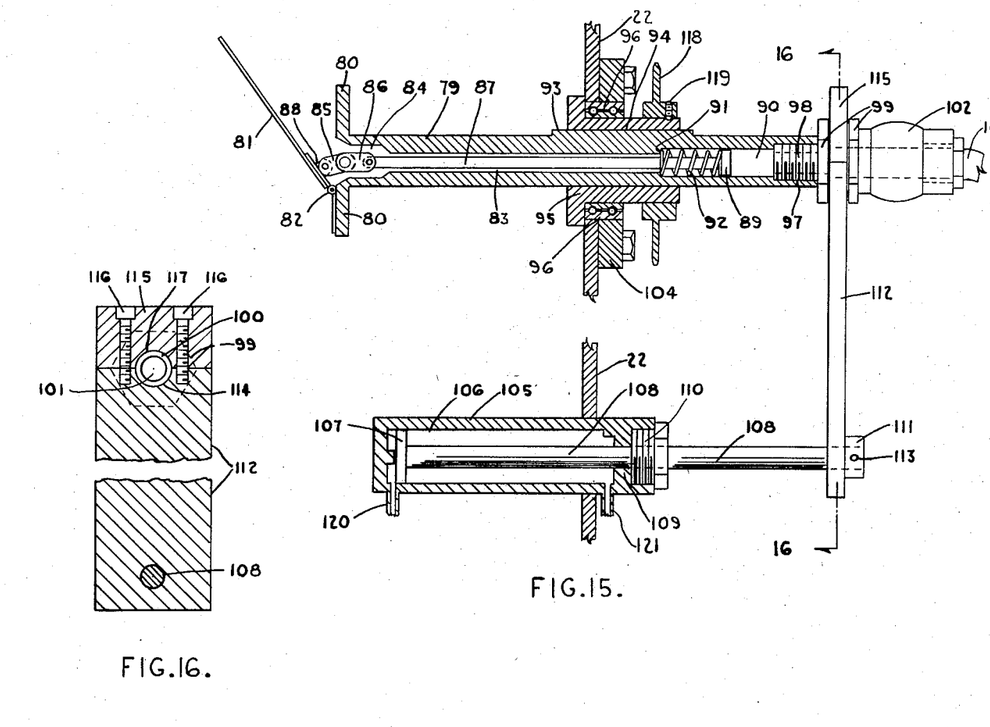
Fig. 15 is a longitudinal sectional view, on an enlarged scale, through the operating means for the twisting members and the holding flaps associated therewith.
Fig. 16 is a section taken on the line 16—16 of Fig. 15.
Figure 18:
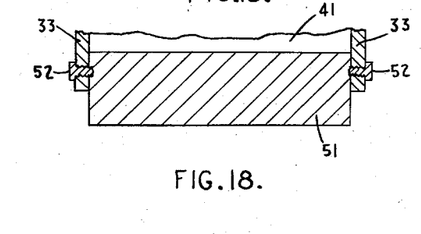
Fig. 18 is a fragmentary section on an enlarged scale, taken on the line 18—18 of Fig. 6.
Figure 19:
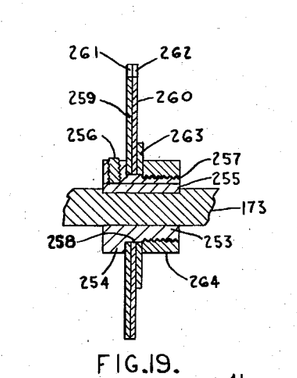
Fig. 19 is a section of one of the cams on an enlarged scale, taken on the line 19—19 of Fig. 8.

The tubular member 79 also has a rib 93 thereon that serves as a key operating in a keyway 94 in a flanged bushing 95, the tubular member 79 thus being longitudinally slidably mounted in said bushing. The bushing 95 is mounted for rotation in the plate 92 by the bearing member 96, which is shown as being a ball bearing. The end of tubular member 79 opposite that having the flange 80 thereon has an internally screw-threaded portion 97 for receiving the threaded shank 98 of a fitting that has a hexagonal body portion 99 which is reduced or grooved to provide a reduced central cylindrical portion 100, as shown in Fig. 16, said fitting having an axial passage 101 therethrough. The fitting also is screw-threadedly connected in a similar manner to that in which it is connected with the tubular member 79 to a swivel fitting 102, which has a flexible compressed air conduit 103 connected therewith, the said swivel fitting being of a well known character and permitting rotation of the tubular member 79 and the fitting 99 without rotation of the conduit member 103. The ball bearing 96 is provided with a mounting member 104 which is secured to the plate 22.

Below the mounting of the tubular member 79, in the above referred to manner on the plate 22, is mounted a compressed air cylinder 105, which has a cylindrical bore 106 therein, in which the piston 107 is mounted for longitudinal sliding movement. Said piston is mounted on a piston rod 108 which extends through a guide passage 109 and through a packing gland 110 in one end of said compressed air cylinder, and has a head 111 thereon to which a bar 112 is secured in fixed position, the head 111 being secured in position on the end of the piston rod 108 by suitable means, such as the pin 113. The bar 112 has a bearing portion 114 formed therein for the cylindrical portion 100 of the fitting 99 and has a cap portion 115 secured thereto by means of the screw-threaded headed members 116, said cap member 115 having a bearing portion 117 provided therein, the bar 112 and cap 115 thus being mounted in a groove within the hexagonal body portion 99 of the fitting that connects the tubular member 79 with the swivel connection 102. The fitting 99 is thus rotatable within the bar 112 and cap 115 and is thus free to rotate with the tubular member 79. The rotatable member 79 is rotated when this is desirable in the operation of the machine by means of a sprocket 118 mounted on the bushing 95 and fixed thereto to rotate therewith, as by means of a set screw 119. The tubular member 79 is also slidably mounted in the bushing 95 and can be moved from the position shown in Fig. 15 to an alternative position nearer to the wall 22 than that shown in Fig. 15 by means of compressed air acting, through a conduit 120, on the piston 107, which will cause the same to be moved to the right as shown in Fig. 15. After the piston 107 has reached its limiting position to the right it is returned after the desired time interval has elapsed to the position shown in Fig. 15 by compressed air entering through the conduit 121. Thus when the piston is being moved to the right the conduit 120 serves as a conduit for supplying compressed air to the cylinder 105 and the conduit 121 serves as a discharge conduit for the compressed air on the right side of the piston 107, while when movement toward the left takes place the reverse is true and the conduit 121 serves as an inlet for compressed air and the conduit 120 as an outlet for the air that is at the left of the piston 107.

Each of the twisting members 77 and 78 is provided with a pair of elongated cup members or trough portions 122, which are secured to the flange 80 and serve as receptacles for the ends of the loaf portions 28. Said receptacles or trough portions 122 are secured in fixed position to the disk-like members 80 by their outer end walls 149 that are secured in a suitable manner face to face to the disk-like members 80. When the piston 107 is in the position shown in Fig. 15 the twisting members 77 and 78 are in the position shown in Fig. 5. It is, of course, to be understood that there is a cylinder 105 for each of the twisting members for moving the same from the position shown in Fig. 5 to the alternative position thereof and back again to the position shown in Fig. 5. The parts are in the position shown in Fig. 5 when the two loaf portions are dropped simultaneously out of the hopper 33, said loaf portions thus engaging the belt 69 in side by side relation with their mid portions and the receptacles 122 with their end portions. As will be evident from Fig. 6, in which twisting member 77 is shown, the two receptacles 122 on a twisting member are transversely spaced and are connected by a flat topped portion 123. When the flap 81 is in its downward position it is in close adjacency with the flat topped wall 123 and thus confines the ends of the two loaf portions in their respective receptacles 122 in each of said twisting members.

While each of said twisting members is provided with a sprocket 118, said twisting members are rotated in opposite directions by suitable driving means, which comprise the sprockets chains 124 and 125 which operate over the sprockets 118 of the twisting members 77 and 78, respectively. Said twisting members are, however, rotated simultaneously through the same arc, making one revolution about the axis of the member 79. The shaft 126 upon which the sprocket 74 is mounted also has a sprocket 127 thereon, over which the chain 128 operates, said chain 128 also operating over a sprocket 129, which is mounted on a shaft 130, but is free to rotate on said shaft 130 until the clutch 131 is in engagement or driving position, said clutch 131 connecting the shaft 130 with the sprocket 129 when said clutch is in engagement. The clutch is normally held out of engagement by a finger 132 on the clutch, which is engaged by a rod-like member 133 that projects from a piston in the cylinder 134 mounted on bracket 267 on frame portion 21, in a similar manner to that in which the rod 108 projects from the cylinder 105, suitable air conduits 135 and 136 being provided leading into the cylinder 134 in a similar manner to the conduits 120 and 121 that lead into the cylinder 105. When the member 133 is withdrawn by the upward movement of the piston in the cylinder 134 the clutch member 131 and the finger 132 thereon rotate with the sprocket 129 and thus with the shaft 130. The controlling means for the compressed air cylinder 134 is such that the rod 133 is only withdrawn for a short interval so that it is again in position to engage the member 132 and throw the clutch out of engagement by the time that the shaft 130 has made one revolution.

A sprocket 137 is mounted on the shaft 130 to rotate therewith and the sprocket chain 124 operates over said sprocket. Accordingly the sprocket 118 on the twisting member 77 is rotated in the same direction as the shaft 130. Thus if the shaft 126 rotates in a clockwise direction as viewed in Fig. 3, then the twisting member, shown in Fig. 6, also rotates in a clockwise direction as viewed in said figure. However, the twisting member 78 rotates in the opposite direction because the sprocket chain 125 operates over an idler sprocket 138 and over the sprocket 118 of the twisting mechanism 78 and the sprocket 139 on shaft 130 engages said sprocket chain on the outer side thereof, thus causing said sprocket chain to have the upper run thereof, as viewed in Fig. 3, travel from right to left, thus rotating the idler sprocket 138 and the sprocket 118 in a counter-clockwise direction.

Figures 3, 13:
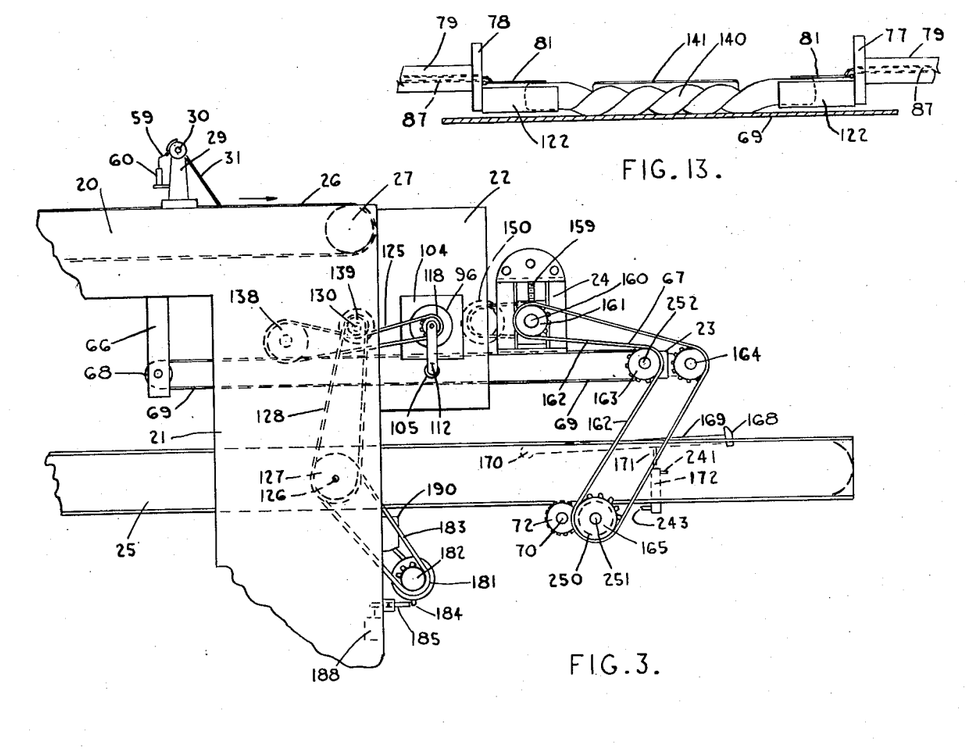
Fig. 3 is a similar view taken from the opposite side of the machine from Fig. 2.
Fig. 13 is a fragmentary view partly in section and partly in elevation, showing the position of the parts of the twisting mechanism at the completion of the twisting operation but prior to release of the twisted loaf from the twisting members.

As a result, with the flaps 81 in a downward position while such rotation of the twisting members 77 and 78 takes place, the two loaf portions 28 are twisted about each other to form the twisted loaf shown at 140 in Fig. 13, the parts being shown in the position just as the twisting operation is completed by one complete revolution of the members 77 and 78 in opposite directions. The means for controlling the operation of the holding flaps 81 and of the reciprocating movement of the members 77 and 78 in the tubular members 79 connected therewith is of such a character that the flaps 81 are moved to raised position from the position shown in Fig. 13 as soon as the rotation of the members 77 and 78 has been completed and the twisting members 77 and 78 are moved, respectively, to the right and left as viewed in Fig. 5 a distance such that the receptacles 122 thereof are out of vertical alignment with the hopper 33 and the ends of the twisted loaf 140 drop into engagemnet with the conveyor belt 69.

Means is provided for moving the conveyor belt 96 to move the twisted loaf 140 away from the twisting mechanism laterally of the twisted loaf 140 and to prevent untwisting of the twisted loaf after the twisting operation has been completed. In order to hold the twisted loaf in twisted condition a flap of sheet material 141 is provided, which is mounted on a shaft 142 to swing with said shaft about its axis of rotation. The flap 141 is preferably made of a synthetic resin material, such as polytetrafluoroethylene. The shaft 142 is mounted in suitable bearings in the plates 22 and has a crank 143 secured thereto, to which is pivotally secured the forked end 144 of a lever 145, said lever 145 being in the form of a piston rod extending from a compressed air cylinder 146, which is similar in construction and operation to the cylinder 105 previously described, and which has a pair of conduits 147 and 148 connected therewith to control the position of a piston in the cylinder 146 in a similar manner to that described in connection with the piston 107 in the cylinder 105. Said piston in the cylinder 146 has alternative positions, in one of which the flap 141 is extending substantially vertically, as shown in Fig. 6, and in the other of which it is in engagement with the twisted loaf 140, as shown in Fig. 13. The means for controlling the position of the piston in the cylinder 146 preferably operates to move the flap 141 toward the position shown in Fig. 13 either before the flaps 81 have been retracted or raised or while these are being raised, and returns the flap 141 to a raised position away from the twisted loaf 140 before movement of the conveyor belt 69 commences. The relatively narrow roller or wheel 150 is mounted on a shaft 151 which is rotatably mounted in a suitable bearing provided on one of the plates 22. A pressure roller 152 is mounted in suitable bearings in slidable blocks 153 in the upstanding frame members 24, said blocks being mounted for guided sliding movement in the openings 154 in said members 24. The position of the roller 152 is adjustable by means of a hand wheel 155 provided on a shaft 156 that has bevel gears 157 thereon meshing with gears 158 having the screw-threaded members 159 mounted on said gears for rotative movement and screwthreadedly engaging with the blocks 153. The mounting of the roller 152 in the blocks 153 is by means of a shaft 160 mounted in said blocks and said shaft has a sprocket 161 mounted on one end thereof by means of which said shaft 160 and the roller 152 are rotated in a clockwise direction as viewed in Fig. 4, said rotation of the roller and shaft being obtained through the sprocket chain 162 which passes over the sprocket 161 and over a sprocket 163 as well as idler sprocket 164 and sprocket 165 fixed on shaft 251. The sprocket 163 is secured to the shaft 252 to rotate therewith and accordingly the roller 152 is rotated whenever the conveyor belt 69 is moved. Since the conveyor belt is traveling from left to right in Fig. 3 the sprocket 163 is rotating in a clockwise direction as viewed in Fig. 3, while the sprocket 161 and the roller 152 are rotated in a counter-clockwise direction as viewed in Fig. 3, or a clockwise direction as viewed in Fig. 4.

The narrow roller or wheel 150 is rotated in the same direction as the roller 152, being driven by means of a sprocket chain 166, which operates over suitable sprockets fixed on the shaft 151 and on the shaft 160. It will be noted upon reference to Figs. 3 and 4 that the rollers 150 and 152 have the surfaces thereof adjacent the conveyor belt 69 moving in the same direction as the conveyor belt. It will also be noted that the roller 150 is on that side of the center line of the belt 69 on which the twisting member 78 is located. The twisting member 78 in its twisting operation is rotated in a direction such that the rotation of the member 150 against the upper side of the twisted piece of dough will hold the twisted dough piece from untwisting, thus holding the twisted loaf in twisted condition due to its rolling action on the upper side thereof until it engages with the roller 152, which presses the twisted loaf portions together on their engaging faces so that these are firmly adhered to each other and will not have any further tendency to untwist.

The twisted loaves are carried by the conveyor belt 69 to the right hand end thereof, as viewed in Figs. 1 and 3, and deposited in a pan on the pan conveyor 167 which is continuously driven from the shaft 126, a suitable stop member 168 for the pans being provided which is operated once for each loaf twisting so that a pan is advanced for every twisted loaf that is delivered from the conveyor belt 69 to the pan that is being held by said stop member. Said stop member is shown as being mounted on a lever 169 that is pivoted at 170 and is retracted by means of a piston rod 171 extending from a compressed air cylinder 172, the position of the piston in which is controlled by suitable controlling means described below.

The controlling means for the various mechanisms above described comprises a cam shaft 173 (Figs. 7 to 10) on which the cams 174, 175, 176, 177, 178, 179 and 180 are mounted to rotate therewith. Said cam shaft is provided with a clutch 181 (Fig. 3) secured thereto and adapted to connect the shaft 173 with a sprocket 182 that is driven by a sprocket chain 183 that operates over a sprocket that rotates with the shaft 126. The sprocket wheel 182 is thus continuously rotating, said rotation being in a clockwise direction as viewed in Figs. 9 and 10. However, the cam shaft does not rotate with the sprocket until the clutch 181 is in driving engagement to connect the sprocket 182 with the shaft 173. Said clutch has a portion that rotates with the shaft 173, when such driving connection has been established, which has a projection 184 thereon and the normal tendency of the clutch is to be in driving engagement unless it is held out of such driving engagement by means resisting rotation of the clutch member 181. Such means is provided in the form of a stop lever 185, which in the position shown in Fig. 9, is in engagement with the projection 184.

Figures 7, 8, 9, 10, 17:
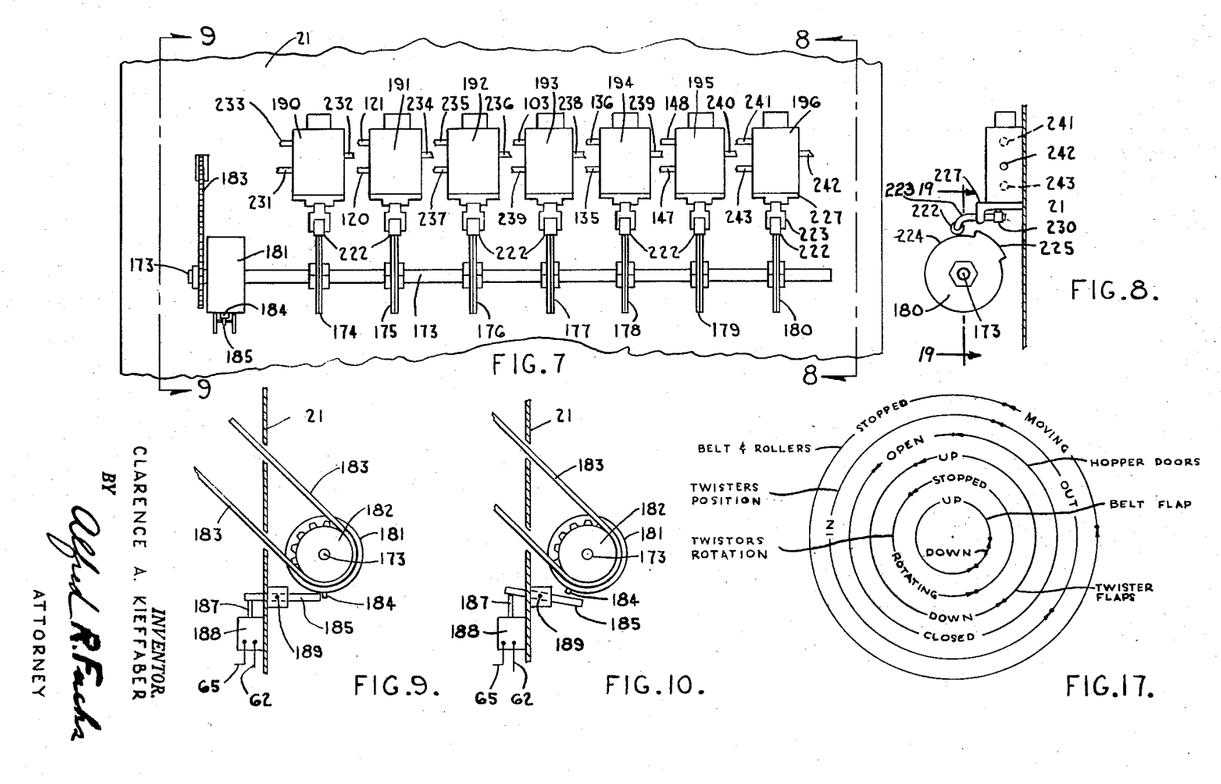
Fig. 7 is a fragmentary vertical sectional view of the cam shaft and air control valves associated therewith.
Fig. 8 is a fragmentary view partly in elevation and partly in section taken on the line 8—8 of Fig. 7.
Fig. 9 is a fragmentary view partly in elevation and partly in section, showing the cam shaft clutch and controlling mechanism therefor in position to hold the clutch disconnected.
Fig. 10 is a view similar to Fig. 9, showing the holding means in releasing position.
Fig. 17 is a diagrammatic view illustrating the portions of one revolution of the cam shaft during which the various mechanisms controlled thereby are operated by the movement of the valves the position of which is controlled by the cams on said cam shaft.
Figure 14:
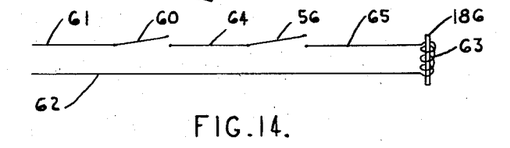
Fig. 14 is a circiut diagram showing the controlling circuit for initiating the successive operations of the twisting mechanism and associated parts.

The solenoid 63, shown diagrammatically in Fig. 14, has a core 186 which has an extension 187 thereon that extends out of the housing 188 for said solenoid, and when said solenoid 163 is energized and the core 186 is pulled upwardly against the action of gravity by the solenoid 63 the extension 187 thereon moves from the position shown in Fig. 9 to that shown in Fig. 10. Said extension 187 engages the rear side of the lever 185, which is pivoted at 189 on a bracket extending from the vertically extending frame portion 21 and thus energization of the solenoid 63 will cause the stop lever 185 to move out of the path of the projection 184, permitting the clutch 181 to move into driving engagement and the entire clutch member 181 to rotate with the shaft 173. As the energization of the solenoid is only for the length of time that the two switches 60 and 56 are closed, this movement of the stop lever 185 to the position shown in Fig. 10 and back again to the position shown in Fig. 9 is only of long enough duration for the projection 184 to pass by the member 185. Accordingly the clutch member 181 will again be thrown out of driving engagement by the time it has made one rotation, as the projection 184 will again engage the member 185. Accordingly the cam shaft 173 rotates once for each closing of the operating circuit by the deposit of two loaf portions in the hopper and a loaf portion moving into engagement with the gate 31, said rotation being through one complete turn of the cam shaft 173.

The cams 174, 175, 176, 177, 178, 179 and 180 control the position of air pressure control valves 190, 191, 192, 193, 194, 195 and 196, respectively. The valves 190, 191, 192, 193, 194, 195 and 196 are the same in construction. Each of said valves has a tubular body portion 197, which has a hollow nut 198 screw-threadedly mounted in one end thereof, and a bushing 199 screwthreadedly engaged in the other end thereof, which has passages 200 therein leading to the bore 201, a transverse passage 202 also being provided in the body portion 197 and in the bushing 199. A passage 203 is also provided in the body portion at the end thereof adjacent the threaded connection with the hollow nut 198 and an opening 204 is provided in the end of the hollow nut 198. Said tubular body portion has a bore 205 therein of uniform size, in which the separator members 206, 207 and 208 are mounted. Said separator members have peripheral grooves 209 therein and annular grooves 210 on the inner sides thereof and portions through which the stem 211 slidably passes, there being suitable means for providing an air tight fit between the engaging portions of the members 206, 207, 208 and the body portion 197, and between the tubular member 211 and the members 206, 207 and 208.

A tubular portion of member 211 has a partition or dividing wall 212 therein and has a plurality of sets of openings 213, 214, 215 and 216 leading from the central passage therethrough on opposite sides of the partition 212. That is, the openings 213 and 214 are connected with each other by a longitudinal passage in the tubular portion of member 211, and the members 215 and 216 are connected with each other by a longitudinal passage in the tubular portion of member 211. A spring 217 is provided bearing against a cup-like member 218 and a suitable head provided on the member 211, which tends to hold the parts in the position shown in Figs. 8 and 12. Passages 219, 220 and 221 extend through the wall of the body portion 197.

Figure 12:
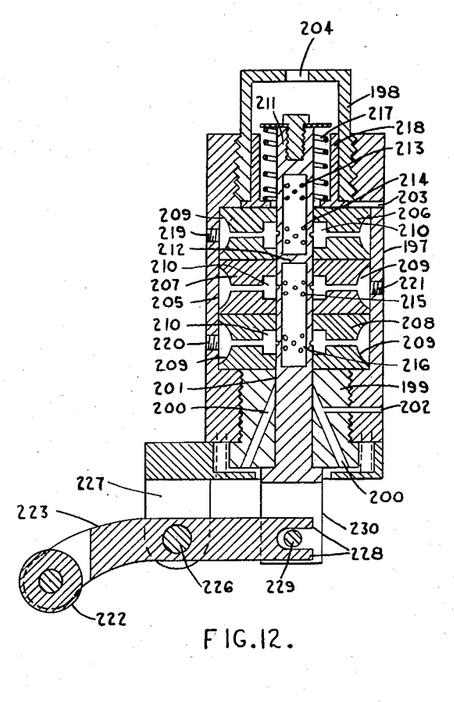
Fig. 12 is a vertical sectional view through one of the air pressure control valves and the operating means therefor, on an enlarged scale.

With the parts in the position shown in Fig. 12 the passages 220 and 221 are connected through the openings 215 and 216 and the passage through the tubular portion of member 211. The passage 219 is connected through the openings 213 and 214 with the space within the upper end of the housing 197 in the hollow nut 198 and thus with the atmosphere through the openings 203 and 204. This position exits when the roller 222 on the lever 223 is in engagement with the low portion 224 of one of the cams.

When the roller engages the high portion 225 of said cam the lever 223 is swung on the pivot 226 which is provided on a bracket 227 mounted on the body portion 197 and the forked end 228 of said lever pulls downwardly on the cross pin 229 on a bracket 230 provided on the member 211, moving it downwardly so that the openings 216 open into the chamber within the bushing 199, while the openings 215 lead to the opening 220. Thus a conduit connected with the opening 220 will be open to the atmosphere through the openings 201 and 202. At the same time the openings 213 and 214 will lead from the opening 221 in the body portion 197 to the opening 219 in said body portion and will supply air under pressure to a conduit connected with said opening 219. In the use of the valve an air pressure line is connected with the opening 221 and conduits leading to the apparatus controlled by said valves lead from the openings 219 and 220. It will accordingly be seen that when the valve is in the position shown in Fig. 12 a conduit connected with the opening 219 will be open to the atmosphere, while a conduit connected with the opening 220 will be connected with the source of air under pressure. When the valve is in the alternative position, which it assumes when the roller is in engagement with the high portion 225 of the cam, then the opening 219 will be connected with the source of air under pressure, as will a conduit connected with said opening, and the opening 220 and a conduit connected therewith will be open to the atmosphere.

The valve 190 controls the operation of the conveyor belt 69 and the rollers 150 and 152. The conduit 231 leading from said valve 190 will be connected with the conduit 232 supplying air under pressure when the low portion of the cam 174 is engaged by the roller 222, and the conduit 233 leading from the valve 190 will be connected with the conduit 232 when the high portion of the cam 174 is in engagement with the roller 222. Said conduits lead to the air pressure cylinder 76 that controls the position of the clutch operating member 75 and the conduit 231 leads into that end of the cylinder that causes the clutch shifting lever 75 to be moved into clutch engaging position, while the conduit 233 leads into the other end of the cylinder and accordingly when the high portion of the cam 190 is in engagement with the roller 222 the clutch will be disengaged and the belt 69 and the rollers 150 and 152 will be stationary.

The valve 191 controls the movement of the twisting members through the cylinders 105 and the conduits 121 leading to the cylinders 105 are connected with the conduit 234 supplying air under pressure to the valve 191 when the parts are in the position shown in Fig 15. This is at the time when the high portion of the cam 175 is engaging with the roller 222 of the valve 191. When the low portion of said cam 176 is engaged by the roller the conduits 120 will be connected with the conduit 234 through the valve 191 and the twisting members will be moved to their outer or more widely separated position. Thus when the high portion of the cam 175 is engaged by the roller 222 of the valve 191 the air under pressure entering the cylinder 105 will immediately move the twisting members to their innermost or closest position to each other, which is the position thereof shown in Figs. 5, 13 and 15, and will remain in that position as long as the high portion of the cam is in engagement with the roller, but will immediately move back to a retracted or outer position when the roller engages the low portion of the cam 175 and will remain in such position as long as the roller 222 is in engagement with such low portion of the cam 175.

The valve 192 controls the operation of the bottom closures or doors 41. The conduit 235 leading from said valve is connected with the cylinder 48 so as to move the piston to the right as viewed in Fig. 4 when air under pressure is supplied to the conduit 235 from the conduit 236, which is when the high portion of the cam 176 is in engagement with the roller 222 of said valve. This causes the swinging of the doors to open position. The doors only remain open for a very brief interval so that the hopper will be closed when the next dough piece reaches the same. Accordingly the high portion of the cam 176 is rather short and as soon as the low portion of said cam is reached, air under pressure is supplied to the conduit 237 from the conduit 236 and the piston is moved back to the position for closing the doors or to its limit of movement to the left in Fig. 4, and remains in this position until air under pressure is again supplied to the conduit 235 by engagement of the high portion of the cam 176 with the roller 222. The adjustment of the cams on the shaft 173 is such that the high portion of the cam 176 does not engage the roller 222 until after the cam 175 has moved the twisting elements into their inner position.

The valve 193 controls the position of the flaps 81. Said valve has the conduits 103 connected therewith so as to lead from the opening 219, the opening 220 being provided with a plug 239. Thus when the high portion of the cam 177 engages the roller 222 the air pressure conduit 238 is connected with the conduits 103. This results in the movement of the pistons 89 in the bores 90 outwardly to the limit of their movement, causing the flaps 81 to move to a horizontal position, such as shown in Fig. 13. The cam 177 is so positioned on the shaft that the roller 222 of the valve 193 will not engage with the high portion thereof until after the doors or bottom closures 41 have been opened by engagement of the roller 222 of the valve 192 with the high portion of the cam 176 and sufficient time has elapsed for the loaf portions 28 to have dropped into the receptacles 122 of the twisters, which would be the position thereof shown in Fig. 5. The high portion of the cam 177 is of such extent that the flaps 81 remain in down position until after the twisting operation has been completed, whereupon the connection between the conduits 238 and 103 is broken due to the roller 222 having reached the low portion of the cam and the springs 92 thereupon return the pistons 89 to their position in which the flaps 81 are vertical, which would be with said pistons substantially in engagement with the threaded end 98 of the fitting 99. (See Fig. 15.) The conduits 103 will then be connected with the atmosphere through the valve 193 so as to permit return of the parts by means of the springs 92.

The valve 194 controls the rotation of the twisting means 77 and 78, the conduit 136 leading from said valve 194 being connected with the air under pressure conduit 239 when the high portion of the cam 178 is engaged by the roller 222 of said valve 194. The supply of air under pressure to the cylinder 134 through the conduit 136 causes upward travel of the piston therein and upward movement of the holding finger 133 so that it disengages from the clutch controlling finger projection 132, permitting the clutch to engage and causing the rotation of the twisting members in opposite directions as above described to begin. The high portion of the cam 178 is very short so that as soon as upward movement of the piston in the cylinder 134 has been completed return movement thereof commences due to the fact that the low portion of the cam is now engaged by the roller 222, causing the conduit 135 to be connected with the air under pressure conduit 239, returning the piston to its lower position in the cylinder 134 and again placing the stop member 133 in the path of the cooperating member 132. Accordingly the clutch mechanism and the shaft 130 only make one rotation for each time that the cam shaft 173 rotates.

The valve 195 controls the operation of the flap 141. When the high portion of the cam 179 is engaged by the roller 222 of the valve 195 the air under pressure conduit 240 is connected through said valve with the conduit 148. This causes the flap 141 to be moved downwardly toward the belt 69 into engagement with the twisted loaf 140 thereon. The movement of the flap 141 takes place immediately after the twisting operation is completed. The cam 179 is so set that the high portion thereof will be engaged by the roller 222 of the valve 195 after the rotative movement of the twisting members has been completed. At substantially the same time that the flap 141 has been moved downwardly by means of the actuation of the valve 195 by the cam 179 the flaps 81 are raised due to the fact that the low portion of the cam 177 is engaged by the roller 222 of the valve 193. Immediately after the low portion of the cam 177 is engaged by the roller 222 of the valve 193 the low portion of the cam 175 is engaged by the roller 222 of the valve 191, causing the twisting members to be moved to their outer position or their greatest distance away from each other. The flap 141 remains in engagement with the twisted loaf 140 only until this outward movement of the twisting members has been completed, the high portion of the cam 179 being only of such extent that the movement of the flaps 181 and the twisting members 77 and 78, above referred to, can take place before the low portion of said cam is reached and the conduit 147 is connected with the conduit 240 to return the flap 141 to the position shown in Fig. 6. Such return movement of the member 141 is rather rapid, but as soon as it has started so that the loaf 140 is no longer engaged by the member 141, the low portion of the cam 174 is in engagement with the roller 222 and the conduit 231 is connected with the conduit 232, moving the clutch operating member 75 to clutch engaging position, the belt 69 being thereby started in its movement and the rollers 150 and 152 being set in motion, this continuing until the last cycle of operations as above described takes place.

The conveyor belt 69 carries the twisted loaves to the right and deposits these in pans on the pan conveyor. The cam 180 controls the operation of the pan stop 168 and is provided with a very short high portion, as it is only desired to move the stop 168 downwardly long enough for the pan engaged thereby to be released, it being moved upwardly again under the influence of the piston in the cylinder 172 promptly so that it will engage the next pan and hold it. When the high portion of the cam 180 engages the roller 222 the conduit 241 is connected with the air pressure conduit 242, this causing the piston in the cylinder 172 to travel downwardly and retracting the stop 168. As soon as the low portion of the cam 180 is engaged by the roller 222 the air pressure conduit 242 is connected with the conduit 243, causing the piston in the cylinder 172 to move to its uppermost position with the stop 168 ready to engage the next pan. The cam 180 may be so adjusted that one or more twisted loaves are on the conveyor belt 69, the adjustment of the cam 180 on the shaft being such that when a loaf has dropped into a pan the stop 168 is immediately thereafter retracted so that the next pan can move up quickly for receiving the next loaf.

One cycle of operations of the twisting mechanism and the associated parts is diagrammatically illustrated in Fig. 17, the sequence of operation thereof being shown in said diagram. Thus the circle designated "Belt & Rollers" shows that the belt 69 is stopped as well as the rollers 150 and 152 by the cam and air valve controlling mechanism above described, and immediately thereafter the twisting members 77 and 78 are moved inwardly to their inner position, the beginning of the various periods designated in the diagram being indicated by a dot on the circle representing the particular apparatus diagramed therein and the arrow head indicating the ending thereof. The cycle is presumed to be taking place in a counter-clockwise direction, as indicated in Fig. 17. Said diagram also shows that the hopper doors 41 move to their open position shortly after the twisting members have moved to their inner position and a reasonable period of time after such opening of the doors the twister flaps 81 move down into holding position, the opening of the doors having dropped the two loaf portions into the receptacles 122 therefor. As a result the ends of the loaves are held in the twisting members. Shortly after said flaps have moved to the down position the rotation of the twisters starts and this continues for one complete revolution for each of the twisting members. The cam arrangement is such that the holding flaps 81 remain down until the rotation of the twisting members has been completed. After the completion of such rotation of the twisting members the twister flaps are moved upwardly to their up position and remain in such up position until after the hopper doors are opened during the next cycle. It will be noted that the hopper doors close substantially at the time that the twisting operation commences by rotation of the twisting members and remain closed until an appropriate time for the twisting members to receive the next pair of loaf portions. It will also be noted from the diagram that the flap 141 that cooperates with the belt, referred to as a "Belt Flap" in the diagram, moves down into twisted loaf holding position immediately after the rotation of the twisting members has stopped and at about the time that the twister flaps 81 are moved upwardly into their vertical position. The twisted loaf is thus deposited completely on the conveyor belt 69 with the flap 141 in engagement therewith. After such deposit of the twisted loaf 140 on the belt 69 has taken place, and the twisting members have been moved to their outer position, the flap 141 moves upwardly away from engagement with the loaf and immediately thereafter the conveyor belt 69 begins its movement, as do the rollers 150 and 152. The twisted loaf is then carried to and deposited in the pan by discharge from the conveyor belt 69 into the pan that is in proper position for receiving the loaf on the pan conveyor members 167.

The cams 174, 175, 176, 177, 178, 179 and 180 are each of the same construction, and while the high and low portions of said cams may vary, as will be explained below, in accordance with the use to which the same are put, the general character of each of said cams is the same. Each of said cams is provided with a flanged collar 253 having a flange 254, which is fixed on the shaft 173 by means of a key 255 and a set screw 256 to thus hold said collar in a predetermined fixed position on the shaft 173 against any axial movement on the shaft as well as any rotational movement thereof. The flanged collar has an externally threaded portion 257, which extends upwardly from a cylindrical shoulder 258 thereon adjacent the flange 254. Mounted on said cylindrical shoulder are the disk-like cam portions 259 and 260 having high portions 261 and 262. In the case of the cam 180 shown in Fig. 8 the cam portions 261 and 262 are in transverse alignment with each other so as to give a combined high portion 225 of minimum length around the cam. However, said disk-like members 259 and 260 are rotatable on the shoulder 258 of the collar 253 to any desired position around the axis of the shaft 173 and to any desired position relative to each other so as to obtain any combined length of the high portions 261 and 262 of said cam that may be desired.

After the cam disks 259 and 260 have been adjusted to their desired position on the shaft in the above referred to manner to obtain the proper timing for the operation of the valve which the particular cam controls and the proper length of high and low portion for the cam for obtaining the length of time that the valve is in its two alternative positions, suitable clamping means is utilized for clamping the disks 259 and 260 to each other and to the flange 256 to thus hold said cams in proper position so that the high portions thereof are at the proper location around the axis of the shaft for the desired operation of the cam and of the proper length for this purpose. Said clamping means comprises a washer 263 and a nut 264 that engages the threaded portion 257 of the collar 253, serving to thus clamp the disks 259 and 260 to each other and to the flange 254. It will accordingly be seen that the cams on the cam shaft 173 are independently adjustable about the shaft and are each independently adjustable to vary the high and low portions thereof and that these cams can thus be readily adjusted to their proper length and proper positions around the shaft to get the desired sequence of operations of the various mechanisms of the machine, as above described.

In the event it is desired to not make twisted loaves of bread on the molding machine, full size loaves are molded and are carried along on the conveyor belt 26 to the hopper 33. In order that each loaf be discharged directly onto the conveyor belt 69 from the hopper 33 the partition 51 is removed by removing the securing elements 52, thus permitting the loaf, upon deposit in the hopper, to swing partition 37 to a position such that its lower end will engage with the switch actuating member 53. When the next loaf reaches the gate 31 the hopper doors 41 are opened and the loaf drops on the conveyor belt 69.

In order to prevent the twisting members from operating on the loaf, the rollers 222 are disengaged from the cams 175, 177, 178 and 179 by removal of the pivot pins 226. As a result the air under pressure will be supplied to the conduits 120, holding the twisting members in retracted or outer position, the springs 92 will hold the flaps 81 in raised or up position as the conduits 103 will be connected with the atmosphere and the twisting members will be held stationary because the conduit 135 will be connected with the air pressure cylinder 134, preventing the clutch 129 from moving into driving engagement. This is due to the fact that the springs in the valves will normally hold the valves in a position which corresponds to the positions of the valves when the low portions of the cams are engaged by the rollers 222. Similarly the flap 141 will remain in the position shown in Fig. 4 because air under pressure will be supplied to the conduit 147 continuously with the roller 222 of the valve 195 out of engagement with the cam 179.

What I claim is:

1. In a machine for twisting a plurality of elongated loaf poritons about each other to form a loaf, a conveyor for said elongated loaf portions, a hopper receiving said loaf portions from said conveyor, twisting mechanism receiving a plurality of said loaf portions from said hopper, and means controlling discharge of said loaf portions from said hopper and the operation of said twisting mechanism comprising a member in the path of said loaf portions on said conveyor, a loaf portion actuated member cooperating therewith in said hopper, and means for directing a first loaf portion deposited in said hopper away from and a second loaf portion deposited therein into actuating engagement with said loaf portion actuated member in said hopper.

2. In a machine for twisting a plurality of elongated loaf portions about each other to form a loaf, a conveyor for said elongated loaf portions, a hopper receiving said loaf portions from said conveyor, twisting mechanism receiving a plurality of said loaf portions from said hopper, and means controlling discharge of said loaf portions from said hopper and the operation of said twisting mechanism comprising a switch operating member in the path of said loaf portions on said conveyor, a switch operating member cooperating therewith in said hopper, and means for directing a first loaf portion deposited in said hopper away from and a second loaf portion deposited therein into operating engagement with said switch operating member in said hopper.

3. In a machine for twisting a plurality of elongated loaf portions about each other to form a loaf, a conveyor for said elongated loaf portions, a hopper receiving said loaf portions from said conveyor, twisting mechanism receiving a plurality of said loaf portions from said hopper, and means controlling discharge of said loaf portions from said hopper and the operation of said twisting mechanism comprising a controlling circuit including a pair of switches included serially therein, an actuating member for closing one of said switches in the path of said loaf portions on said conveyor and an actuating member for closing the other of said switches in said hopper and means for directing a first loaf portion deposited in said hopper away from and a second loaf portion deposited therein into operating engagement with said switch actuating member in said hopper.

4. In a machine for twisting a pair of elongated loaf portions about each other to form a loaf, a conveyor for said elongated loaf portions, a hopper below the discharge end of said conveyor having means for dividing the same into a pair of elongated laterally adjacent pockets, means for directing a first elongated loaf portion into one of said pockets and a second elongated loaf portion into the other of said pockets, twisting mechanism receiving said loaf portions from said hopper, and means controlling discharge of said loaf portions from said hopper and the operation of said twisting mechanism comprising a member in the path of said loaf portions on said conveyor and a member cooperating therewith in said hopper in a position to be actuated only by a loaf portion deposited in said last mentioned pocket.

5. In a machine for twisting a pair of elongated loaf portions about each other to form a loaf, a conveyor for said elongated loaf portions, a hopper below the discharge end of said conveyor having removable means for dividing the same into a pair of elongated laterally adjacent pockets, twisting mechanism receiving said loaf portions from said hopper, and means controlling discharge of said loaf portions from said hopper and the operation of said twisting mechanism comprising a member in the path of said loaf portions on said conveyor, a member in said hopper cooperating therewith, and loaf directing means in said hopper movable by engagement of a first loaf portion therewith into a position to direct a second loaf portion into actuating engagement with said member in said hopper.

6. In a machine for twisting a pair of elongated loaf portions about each other to form a loaf, a conveyor for said elongated loaf portions, a hopper below the discharge end of said conveyor having means for dividing the same into a pair of elongated laterally adjacent pockets, means for directing a first elongated loaf portion into one of said pockets and a second elongated loaf portion into the other of said pockets, a downwardly opening bottom closure for each of said pockets, means for opening said bottom closures simultaneously, means for operating said last mentioned means to open said closures, and means controlling the operation of said operating means comprising a member in the path of said loaf portions on said conveyor and a member cooperating therewith in said hopper in a position to be actuated only by a loaf portion deposited in said other pocket.

7. In a machine for twisting a pair of elongated loaf portions about each other to form a loaf, a conveyor for said elongated loaf portions, a hopper below the discharge end of said conveyor having means for dividing the same into a pair of elongated laterally adjacent pockets, means for directing a first elongated loaf portion into one of said pockets and a second elongated loaf portion into the other of said pockets, a downwardly opening bottom closure for each of said pockets, means for opening said bottom closures simultaneously, means for operating said last mentioned means to open said closures, and means controlling the operation of said operating means comprising a controlling circuit including a pair of switches included serially therein, an actuating member for closing one of said switches in the path of said loaf portions on said conveyor and an actuating member for closing the other of said switches in a position in said hopper to be actuated only by a loaf portion deposited in said other pocket.

8. In a machine for twisting a plurality of elongated loaf portions about each other to form a loaf, a supporting member, a pair of axially spaced rotatable twisting members mounted over said supporting member, means for simultaneously depositing a plurality of said elongated loaf portions in side by side relation on said supporting member with the end portions thereof mounted on said twisting members, means for rotating said twisting members about a common axis simultaneously in opposite directions through a predetermined arc while maintaining said spacing to twist said loaf portions about each other, and means for increasing the axial spacing of said twisting members from each other after rotation thereof through said arc has been completed, said spacing increase depositing the ends of the twisted loaf on said supporting member.

9. In a machine for twisting a plurality of elongated loaf portions about each other to form a loaf, a movable supporting member, a pair of axially spaced rotatable twisting members mounted over said supporting member, means for simultaneously depositing a plurality of said elongated loaf portions in side by side relation on said supporting member with the end portions thereof mounted on said twisting members, means for rotating said twisting members about a common axis simultaneously in opposite directions through a predetermined arc while maintaining said spacing to twist said loaf portions about each other, means for increasing the axial spacing of said twisting members from each other after rotation thereof through said arc has been completed, said spacing increase depositing the ends of the twisted loaf on said supporting member, and means for moving said supporting member transversely of the said axis operative to move said supporting member only after the increase in spacing of said twisting members is completed.

10. In a machine for twisting a plurality of elongated loaf portions about each other to form a loaf, a flat faced supporting member, a pair of axially spaced rotatable twisting members mounted over said supporting member adjacent the flat top face thereof, means for simultaneously depositing a plurality of said elongated loaf portions in side by side relation on said flat top face of the supporting member with the end portions thereof mounted on said twisting members, means for rotating said twisting members about a common axis simultaneously in opposite directions through a predetermined arc while maintaining said spacing to twist said loaf portions about each other, and means for increasing the axial spacing of said twisting members from each other after rotation thereof through said arc has been completed, said spacing increase depositing the ends of the twisted loaf on the flat top face of said supporting member.

11. In a machine for twisting a plurality of elongated loaf portions about each other to form a loaf, a supporting member, a pair of axially spaced rotatable twisting members mounted over said supporting member for reciprocating movement between a position of lesser axial spacing and a position of greater axial spacing, means for simultaneously depositing a plurality of said elongated loaf portions in side by side relation on said supporting member with the end portions thereof mounted on said twisting members while said twisting members are in their position of lesser axial spacing, means for rotating said twisting members about a common axis simultaneously in opposite directions through a predetermined arc while maintaining said spacing to twist said loaf portions about each other, and means for moving said twisting members to said position of greater spacing after rotation thereof through said arc has been completed.

12. In a machine for twisting a plurality of elongated loaf portions about each other to form a loaf, a conveyor belt, a pair of axially spaced rotatable twisting members mounted over said belt adjacent the top face thereof for reciprocating movement between a position of lesser axial spacing and a position of greater axial spacing, means for simultaneously depositing a plurality of said elongated loaf portions in side by side relation on said belt with the end portions thereof mounted on said twisting members while said twisting members are in their position of lesser axial spacing, means for rotating said twisting members about a common axis simultaneously in opposite directions through a predetermined arc while in said position, means for moving said twisting members to said position of greater spacing after rotation thereof through said arc has been completed, and means for moving said conveyor belt after said twisting members have reached their position of greater spacing.

13. In a machine for twisting a plurality of elongated loaf portions about each other to form a loaf, a supporting member, a pair of axially spaced rotatable twisting members mounted over said supporting member for reciprocating movement between a position of lesser axial spacing and a position of greater axial spacing, said twisting members each comprising a pair of receptacles in side by side relation and a flap movable into and out of holding position relative to said receptacles, means for successively moving said twisting members into said position of lesser spacing, depositing a plurality of said elongated loaf portions in side by side relation on said supporting member simultaneously with the end portions thereof mounted in said receptacles while said twisting members are in said position, moving said flaps into holding position and rotating said twisting members about a common axis simultaneously in opposite directions through a predetermined arc while maintaining said position of lesser spacing thereof.

14. In a machine for twisting a plurality of elongated loaf portions about each other to form a loaf, a conveyor belt, a pair of axially spaced rotatable twisting members mounted over said belt adjacent the top face thereof for reciprocating movement between a position of lesser axial spacing and a position of greater axial spacing, said twisting members each comprising a pair of receptacles in side by side relation and a flap movable into and out of holding position relative to said receptacles, means for successively moving said twisting members into said position of lesser spacing, depositing a plurality of said elongated loaf portions in side by side relation on said belt simultaneously with the end portions thereof mounted in said receptacles while said twisting members are in said position, moving said flaps into holding position, rotating said twisting members about a common axis simultaneously in opposite directions through a predetermined arc while maintaining said position of lesser spacing thereof, retracting said flaps and moving said twisting members to said position of greater spacing after rotation thereof through said arc has been completed, and moving said conveyor belt transversely of the axis of rotation of said twisting members after said twisting members have reached their position of greater spacing.

15. In a machine of the character described, a conveyor belt, a pair of axially spaced rotatable twisting members mounted over said belt adjacent the top face thereof for reciprocating movement transversely of said belt between a position of lesser axial spacing and a position of greater axial spacing, means for depositing a plurality of elongated loaf portions in side by side relation on said belt with the end portions thereof on said twisting members while said twisting members are in their position of lesser axial spacing, flaps mounted in position on said twisting members for movement into and out of loaf portion holding position, a holding flap movable toward and away from said belt, and means for successively moving said twisting member flaps into holding position, rotating said twisting members in opposite directions through a predetermined arc about a common axis while in said position of lesser spacing, moving said twisting member flaps out of holding position and said holding flap toward said belt after said twisting members have completed their rotation, moving said twisting members to their position of greater axial spacing, moving said holding flap away from said belt and starting movement of said conveyor belt after raising said holding flap.

16. In a machine of the character described, a conveyor belt, a pair of axially spaced rotatable twisting members mounted over said belt adjacent the top face thereof for reciprocating movement transversely of said belt between a position of lesser axial spacing and a position of greater axial spacing, means for depositing a plurality of elongated loaf portions in side by side relation on said belt with the end portions thereof on said twisting members while said twisting members are in their position of lesser axial spacing, flaps mounted in position on said twisting members for movement into and out of loaf portion holding position, a holding flap movable toward and away from said belt, a narrow roller above said belt between one side and the middle thereof, said roller being spaced lengthwise of said belt from said twisting members and mounted for rotation about an axis extending transversely of said belt, means for rotating said roller in a direction such that its periphery nearest said belt travels in the same direction as said belt, and means for successively moving said twisting member flaps into holding position, rotating said twisting members in opposite directions through a predetermined arc about a common axis while in said position of lesser spacing, moving said twisting member flaps out of holding position and said holding flap toward said belt after said twisting members have completed their rotation, moving said twisting members to their position of greater axial spacing, moving said holding flap away from said belt and starting movement of said conveyor belt and rotation of said roller.

17. In a machine of the character described, a conveyor belt, a pair of axially spaced rotatable twisting members mounted over said belt adjacent the top face thereof for reciprocating movement transversely of said belt between a position of lesser axial spacing and a position of greater axial spacing, means for depositing a plurality of elongated loaf portions in side by side relation on said belt with the end portions thereof on said twisting members while said twisting members are in their position of lesser axial spacing, flaps mounted in position on said twisting members for movement into and out of loaf portion holding position, a holding flap movable toward and away from said belt, a narrow roller above said belt between one side and the middle thereof, said roller being spaced lengthwise of said belt from said twisting members and mounted for rotation about an axis extending transversely of said belt, an elongated roller mounted above said belt for rotation about an axis extending transversely of said belt and spaced farther lengthwise of said belt from said twisting members than said narrow roller, means for rotating said rollers in a direction such that the peripheries thereof nearest said belt travel in the same direction as said belt, and means for successively moving said twisting member flaps into holding position, rotating said twisting members in opposite directions through a predetermined arc about a common axis while in said position of lesser spacing, moving said twisting member flaps out of holding position and said holding flap toward said belt after said twisting members have completed their rotation, moving said twisting members to their position of greater axial spacing, moving said holding flap away from said belt and starting movement of said conveyor belt and rotation of said rollers.

18. In a machine for twisting a plurality of elongated loaf portions about each other to form a loaf, a conveyor for said elongated loaf portions, a hopper receiving said loaf portions from said conveyor, twisting mechanism receiving a plurality of said loaf portions from said hopper, and means controlling discharge of said loaf portions from said hopper and the operation of said twisting mechanism comprising a cam shaft, cams on said shaft controlling the operation of the elements of said twisting mechanism and discharge from said hopper in predetermined sequence, means for driving said cam shaft comprising a clutch, means for holding said clutch in disengaged position, and means for releasing said holding means comprising a solenoid for moving said member to releasing position upon energization of said solenoid, said solenoid being included in an electrical circuit having a pair of switches included serially therein, an actuating member for closing one of said switches in the path of said loaf portions on said conveyor, an actuating member for closing the other of said switches in said hopper, and means for directing a first loaf portion deposited in said hopper away from and a second loaf portion deposited therein into operating engagement with said switch actuating member in said hopper.

19. In a machine for twisting a plurality of elongated loaf portions about each other to form a loaf, a conveyor for said elongated loaf portions, a hopper receiving said loaf portions from said conveyor, twisting mechanism receiving a plurality of said loaf portions from said hopper, and means controlling discharge of said loaf portions from said hopper and the operation of said twisting mechanism comprising a cam shaft, compressed air cylinders controlling the operation of the elements of said twisting mechanism and discharge from said hopper, valves controlling operation of said air cylinders, cams on said shaft controlling the position of said valves, means for driving said cam shaft comprising a clutch, means for holding said clutch in disengaged position, and means for releasing said holding means comprising a solenoid for moving said member to releasing position upon energization of said solenoid, said solenoid being included in an electrical circuit having a pair of switches included serially therein, an actuating member for closing one of said switches in the path of said loaf portions on said conveyor, an actuating member for closing the other of said switches in said hopper, and means for directing a first loaf portion deposited in said hopper away from and a second loaf portion deposited therein into operating engagement with said switch actuating member in said hopper.

20. In a machine for twisting a plurality of elongated loaf portions about each other to form a loaf, a conveyor for said elongated loaf portions, a hopper receiving said loaf portions from said conveyor, twisting mechanism receiving a plurality of said loaf portions from said hopper, and means controlling discharge of said loaf portions from said hopper and the operation of said twisting mechanism comprising a cam shaft, cams on said shaft controlling the operation of the elements of said twisting mechanism and discharge from said hopper in predetermined sequence, means for driving said cam shaft comprising a clutch, means for holding said clutch in disengaged position comprising an operating member rotatable with said shaft upon engagement of said clutch, a member in the path of said operating member holding said clutch disengaged upon engagement with said operating member, and a solenoid for moving said last mentioned member out of the path of said operating member upon energization thereof, said solenoid being included in an electrical circuit having a pair of switches included serially therein, an actuating member for closing one of said switches in the path of said loaf portions on said conveyor, an actuating member for closing the other of said switches in said hopper, and means for directing a first loaf portion deposited in said hopper away from and a second loaf portion deposited therein into operating engagement with said switch actuating member in said hopper.

21. In a machine for twisting a plurality of loaf portions about each other to form a loaf, a twisting mechanism comprising a conveyor belt, rotatable twisting members over said belt engaging opposite ends of loaf portions on said belt to twist the same in opposite directions, said twisting members disengaging said ends after completing their twisting operation, and means cooperating with said belt to hold said loaf in twisted condition comprising a member movable toward and away from said belt and a rotatable member over said belt successively engaging said twisted loaf upon disengagement of said twisting members from said ends.

22. In a machine for twisting a plurality of load portions about each other to form a loaf, a twisting mechanism comprising a conveyor belt, rotatable twisting members over said belt engaging opposite ends of loaf portions on said belt to twist the same in opposite directions, said twisting members disengaging said ends after completing their twisting operation, and means cooperating with said belt to hold said loaf in twisted condition comprising a member movable toward and away from said belt, a rotatable member over said belt and a pressure roller successively engaging said twisted loaf upon disengagement of said twisting members from said ends.

23. In a machine for twisting a plurality of elongated loaf portions about each other to form a loaf, a conveyor for said elongated loaf portions, a hopper receiving said loaf portions from said conveyor, twisting mechanism receiving a plurality of said loaf portions from said hopper, and means controlling discharge of said loaf portions from said hopper and the operation of said twisting mechanism comprising a cam shaft, cams on said shaft controlling the operation of the elements of said twisting mechanism and discharge from said hopper in predetermined sequence, each of said cams being independently adjustable about said cam shaft and each cam being adjustable to vary the high and low portions thereof, means for rotating said cam shaft through one revolution for each actuation thereof comprising a clutch and means controlling the operation of said clutch comprising a member in the path of said loaf portions on said conveyor, a member cooperating therewith in said hopper in a position to be engaged by a loaf portion received in said hopper, and means for directing a first loaf portion deposited in said hopper away from and a second loaf portion deposited therein into engagement with said member in said hopper.

24. In a machine for twisting a plurality of elongated loaf portions about each other to form a loaf, a conveyor for said elongated loaf portions, a hopper receiving said loaf portions from said conveyor, twisting mechanism receiving a plurality of said loaf portions from said hopper, and means controlling discharge of said loaf portions from said hopper and the operation of said twisting mechanism comprising a cam shaft, cams on said shaft controlling the operation of the elements of said twisting mechanism and discharge from said hopper in predetermined sequence, each of said cams being independently adjustable about said cam shaft and each cam being adjustable to vary the high and low portions thereof, means for driving said cam shaft comprising a clutch, means for holding said clutch in disengaged position, and means for releasing said holding means comprising a solenoid for moving said member to releasing position upon energization of said solenoid, said solenoid being included in an electrical circuit having a pair of switches included serially therein, an actuating member for closing one of said switches in the path of said loaf portions on said conveyor, an actuating member for closing the other of said switches in said hopper, and loaf portion directing means in said hopper holding the first loaf portion entering said hopper from engagement with said switch actuating member and actuated by said first loaf portion to direct the next succeeding loaf portion into said hopper into actuating member engaging position.

25. In a machine for twisting a plurality of elongated loaf portions about each other to form a loaf, a conveyor for said elongated loaf portions, a hopper receiving said loaf portions from said conveyor, twisting mechanism receiving a plurality of said loaf portions from said hopper, and means controlling discharge of said loaf portions from said hopper and the operation of said twisting mechanism comprising a cam shaft, compressed air cylinders controlling the operation of the elements of said twisting mechanism and discharge from said hopper, valves controlling operation of said air cylinders, cams on said shaft controlling the position of said valves, each of said cams being independently adjustable about said cam shaft and each cam being adjustable to vary the high and low portions thereof, means for rotating said cam shaft through one revolution for each actuation thereof comprising a clutch and loaf portion actuated means controlling the operation of said clutch, comprising a member in the path of said loaf portions on said conveyor, a member cooperating therewith in said hopper in a position to be engaged by a loaf portion received in said hopper, and means for directing a first loaf portion deposited in said hopper away from and a second loaf portion deposited therein into engagement with said member in said hopper.

References Cited in the file of this patent

UNITED STATES PATENTS

| | | |
|---|---|---|
| 1,998,560 | Smith | Apr. 23, 1935 |
| 2,037,985 | Kummer | Apr. 21, 1936 |
| 2,175,119 | Howe | Oct. 3, 1939 |
| 2,188,536 | Fonken | Jan. 30, 1940 |
| 2,216,787 | Steadman | Oct. 8, 1940 |
| 2,241,659 | Fonken | May 13, 1941 |
| 2,259,476 | MacManus | Oct. 21, 1941 |
| 2,337,526 | Steadman | Dec. 21, 1943 |
| 2,337,527 | Steadman et al. | Dec. 21, 1943 |
| 2,405,684 | Buechek | Aug. 13, 1946 |